US005228623A

United States Patent [19]

Raghavan et al.

[11] Patent Number: 5,228,623

[45] Date of Patent: Jul. 20, 1993

[54] AIRPORT RUNWAY CLEANING METHOD AND APPARATUS

[76] Inventors: Chidambaram Raghavan, 13834 SE. Fairwood Blvd., Renton, Wash. 98058; John H. Olsen, Rte. 5, Box 442, Vashon Island, Wash. 98070

[21] Appl. No.: 817,463

[22] Filed: Jan. 3, 1992

Related U.S. Application Data

[63] Continuation of Ser. No. 359,286, May 31, 1989, Pat. No. 5,078,161.

[51] Int. Cl.[5] .......... B05B 3/02; B05B 1/28; F16L 35/00

[52] U.S. Cl. .......... 239/227; 239/248; 239/264; 239/288; 285/24

[58] Field of Search .......... 239/225.1, 227, 243, 239/248, 263, 263.1, 264, 265, 288, 288.3, 288.5, 160; 285/24, 368; 15/50.1

[56] References Cited

U.S. PATENT DOCUMENTS

| | | | |
|---|---|---|---|
| 3,301,576 | 1/1967 | Vigneron | 285/368 |
| 3,520,561 | 7/1970 | Rininger | 285/24 |
| 3,829,019 | 8/1974 | Petsch | 239/251 |
| 3,966,234 | 6/1976 | Sundholm | 285/24 |
| 4,047,666 | 9/1977 | Hart | 239/251 |
| 4,107,816 | 8/1978 | Matthews | 239/225 |
| 4,191,589 | 3/1980 | Halls et al. | 239/251 |
| 4,191,590 | 3/1980 | Sundheim | 239/251 |
| 4,219,155 | 8/1980 | Goerss | 239/264 |
| 4,448,448 | 5/1984 | Pollia | 285/368 |
| 4,690,325 | 9/1987 | Pacht | 239/263.1 |
| 4,715,539 | 12/1987 | Steele | 239/263 |
| 4,782,551 | 11/1988 | Ballwebber | 239/225.1 |
| 4,832,379 | 5/1989 | Smith et al. | 285/368 |
| 4,903,364 | 2/1990 | Long | 15/50.1 |
| 5,135,015 | 8/1992 | Young | 239/288.5 |

*Primary Examiner*—Andres Kashnikow
*Assistant Examiner*—Christopher G. Trainor
*Attorney, Agent, or Firm*—Hughes & Multer

[57] ABSTRACT

An apparatus to remove rubber from airplane tires from an airport runway surface. there is a manifold arm which rotates at as high as two thousand five hundred rpms over the runway surface, with a plurality of water jets being discharged downwardly at a relatively high pressure (e.g. thirty five thousand P.S.I.) against the runway surface. Even though the water pressure is at a level several times higher than that at which damage to the runway surface can occur, at the relatively high linear speed of the water jets (e.g. ninety to one hundred eighty miles per hour), there is no noticeable damage to the runway surface, but yet there is quite effective removal of the accumulated rubber. Also disclosed is a particular shaft and seal assembly which is capable of operating at relatively high rotational speeds and delivering the high pressure to the manifold arm.

14 Claims, 8 Drawing Sheets

AIRPORT RUNWAY CLEANING METHOD AND APPARATUS

The present patent application is a continuation of U.S. patent application Ser. No. 359,286, filed May 31, 1989, "AIRPORT RUNWAY CLEANING METHOD AND APPARATUS", Raghavan et al, now U.S. Pat. No. 5,078,161, issued Jan. 7, 1992.

BACKGROUND OF THE INVENTION

1. Field of the invention

The present invention relates to a method and apparatus for cleaning a surface material from an underlying surface of a substrate, and more particularly to such a method and apparatus where the underlying surface is susceptible to damage by impingement of high pressure water jets. A particular application of this is for the removal of rubber or paint from an airport runway surface made of concrete or asphalt/rock aggregate material.

2. Background Art

When airplanes land on a runway, the tires of the airplane will commonly skid over the runway surface for a certain distance, with some of the rubber from the tires becoming deposited on the runway surface and also being bonded thereto. Over a certain period of time, this layer of rubber can accumulate so as to become a safety hazard. Accordingly, it has been found to be desirable to remove this rubber layer at periodic intervals.

One method of removal of surface material is by use of high pressure water jets, and this method is sometimes used in cleaning runway surfaces. The commercially practiced prior art method known to the applicants herein is one where water jets at a pressure of approximately 10,000 psi are arranged in an array at a stationary location on a vehicle, and the vehicle moves over the runway surface at a speed of up to possibly as high as ten miles per hour. However, it has been found rubber removal from the runway in this manner is less than totally effective. There is a further problem that the runway itself is damaged by having runway surface material flake off.

This damage is particularly noticeable where there is a grooved concrete runway. To explain this more fully, it sometimes happens that over a period of time the concrete surface becomes smooth due to repeated aircraft landings, and grooves of possibly ⅜th of an inch depth and ⅜th of an inch spacing are cut along the runway transverse to the direction of landing of the airplanes, this being done to improve traction between the airplane tires and the runway. However, rubber will eventually fill these grooves, and also become deposited on the total runway surface. When it is attempted to remove this rubber by means of the prior art water jet method as described above, these ridges that define the grooves in the concrete are particularly susceptible to damage from the water jets.

A search of the patent literature has disclosed a number of patents which deal with this general problem area. The following patents are directed specifically toward the problem of cleaning the rubber from airplane tires from runway surfaces.

U.S. Pat. No. 3,877,643 (Smith et al) shows an apparatus for removing a rubber coating from airport runways where a plurality of water jets are discharged from a manifold that is mounted to a vehicle. The manifold is reciprocated laterally transverse to the direction of travel of the vehicle a distance at least equal to the longitudinal distance between adjacent nozzles. In column 3, last line, it is indicated that the pressure of the water at the nozzle should be within a range of four thousand to eight thousand P.S.I.

U.S. Pat. No. 3,848,804 (Prestwich) discloses a machine for removing rubber from runway surfaces where a sheet of water, preferably hot water, is emitted from nozzles. It is stated that the pressure should be as high as possible without causing damage to the surface and at least as high as fifty P.S.I. These nozzles are moved in a arcuate path.

U.S. Pat. No. 3,726,481 (Foster) discloses a machine for directing high velocity water jets from a manifold against a runway surface to remove rubber. At the top of column 7, it is stated that the water is discharged as jets at four thousand pounds per square inch.

U.S. Pat. No. 3,709,436 (Foster) shows another runway cleaning machine where there is a frame which carries a manifold and which is adapted to be removably mounted on the front of a forklift. Fan-shaped jets are utilized. No operating pressures are specified.

U.S. Pat. No. 3,987,964 (Pittman et al) discloses a machine adapted to clean rubber and the like from a runway, where there is provided a plurality of fan-shaped water jets which are emitted from a stationary manifold mounted on the front part of a truck. In column 7, line 46, it is stated that the pressure of the water is in the range of two hundred to twenty thousand pounds per square inch, with a preferred pressure of around six thousand pounds per square inch. The truck to which the jet manifold is mounted travels at a linear velocity as high as about ten miles an hour and preferably around two to four miles per hour, depending upon the amount of contaminates deposited on the surface and to what degree these stick to the surface.

British Patent Specification 1,327,799 (Prestwich) shows a runway cleaning apparatus where nozzles are positioned at the ends of a rotating arm, with water of at least fifty P.S.I. being emitted from these nozzles to impinge upon the runway surface.

The following five patents are directed toward providing high pressure water jets, but it is not clear whether these patents show any features directed specifically toward the cleaning of airport runway surfaces or the like.

U.S. Pat. No. 4,600,149 (Waktsuki) discloses an apparatus for producing water jets at a pressure of two thousand kilograms per square centimeter. The nozzles which discharge the jets are mounted in a rotating structure so that these jets move in a generally circular path.

The following four patents relate generally to specifics of the construction of the nozzle or the mounting thereof, these being the following:

U.S. Pat. No. 3,902,670 (Koller et al);
U.S. Pat. No. 4,244,524 (Wellings);
U.S. Pat. No. 4,728,041 (Traxier); and
U.S. Pat. No. 4,802,628 (Dautel et al)

SUMMARY OF THE INVENTION

The method and apparatus of the present invention is directed toward removing a coating of a material from an underlying substrate surface by means of a high pressure water jet where the substrate surface is characterized in that it is susceptible to damage by impingement of the water jet thereon. The present invention is particularly directed toward use in connection with a substrate surface of concrete or asphalt/rock aggregate pavement, but within the broader scope of the present invention could be utilized with other material having similar characteristics relative to impingement by a water jet, such as rock, brick, or possibly some softer metals such as aluminum.

A particularly useful application of the method and apparatus of the present invention is to remove rubber and in some instances paint from an airport runway surface. It has been found that very effective removal of the layer (e.g. a rubber layer) can be accomplished by utilizing a water jet of a very high pressure, and traversing the surface which is being cleaned at relatively high linear speeds. Even though the pressure of the water jet is several times greater than that which is capable of damaging the underlying substrate (e.g. a concrete surface or an asphalt/rock aggregate surface) it has been found that damage to the substrate is not just decreased, but rather noticeable damage is nonexistent.

The water jet should be at a pressure which is greater than twenty thousand pounds per square inch, desirably greater than twenty five thousand pounds per square inch, and desirably in the order of thirty five thousand pounds per square inch or greater. The linear speed of travel of the water jet should be at least twenty miles per an hour, preferably at least fifty miles per hour, and more preferably at about eighty miles per hour or greater. In a preferred embodiment disclosed herein an outermost set of jets travels at a linear rate of speed of about 180 miles an hour in a circular path, while a radially inward set of jets travels in a circular path at a linear speed of about 90 miles per hour.

The apparatus of the present invention comprises a housing structure adapted to move over the substrate. A manifold arm means is mounted to the structure in a manner to be positioned above the substrate, and to be rotatable about a generally vertical axis of rotation. Water jet nozzle means is mounted to the manifold arm means at a predetermined distance from the axis of rotation and arranged to discharge at least one water jet toward the substrate as the manifold arm means rotates about the axis of rotation.

Fluid pressure supply means is provided to supply water to the manifold arm means at a pressure greater than twenty thousand pounds per square inch for discharge through the water jet nozzle means. Power transmission means is provided to rotate the manifold arm means at a rotational rate of speed so that the water jet travels linearly in a generally circular path at a speed of at least as great as twenty miles per hour.

Desirably, the water jet nozzle means is arranged to discharge a plurality of water jets at at least first and second water discharge locations spaced at first and second radial distances from the axis of rotation, with the first distance being greater than the second distance. Further, the water jet nozzle means is arranged so that the water jet discharged at the first location has a diameter greater than the water jet discharged at the second location.

A further feature of the present invention is that the fluid pressure supply means comprises a shaft and seal assembly connected to the manifold arm means. This assembly comprises a first shaft which has a first center axis of rotation and a first through opening for passage of high pressure fluid therethrough, and a first end surface that is precisely formed perpendicular to the first axis of rotation. There is a second shaft with a second center axis of rotation, a second centrally located through opening to receive high pressure fluid from the first opening of the first shaft and to deliver the fluid to the manifold means. This second shaft has a second end surface that is formed to be precisely perpendicular through the second axis of rotation, with the second end surface abutting against the first end surface at an abutment plane.

There is a seal sleeve having first and second portions positioned in the first and second shafts around the first and second openings to provide a seal at the abutment plane. First and second O-ring means are positioned in the first and second shafts, respectively, and extend around the first and second sleeve portions, respectively, in sealing relationship therewith.

Other features will become apparent from the following detailed description.

DETAILED DESCRIPTION OF THE INVENTION

The immediate problem toward which the efforts that resulted in a discovery of importance in the present invention were directed is that of removing rubber that is deposited on (and becomes bonded to) airport runway surfaces, this resulting from the skidding of tires on the runway surface. High power water jets have been used in the prior art to remove such rubber from the runway surfaces. However, there have been serious problems not just because of less than adequate removal of the rubber layer, but also damage to the underlying surface.

It is well known in the prior art that high pressure water jets are capable of causing damage to concrete paving and asphalt/rock aggregate paving, and that the severity of the damage will increase with higher pressure jets. However, it has been found that in accordance with the teachings of the present invention, very effective removal of the rubber layer can be accomplished by raising the pressure of the water that forms these jets to very high levels, and traversing the surface which is being cleaner at relatively high linear speeds. Even though the pressure of the water jets is several times greater than that which is capable of damaging the concrete surface, it has been found that when the water jet traverses the surface at very high linear speeds, damage is not just decreased, but rather noticeable damage is nonexistent. Further, it has been found that at these higher pressures, the linear speed of the travel of the jet over the surface to be cleaned can be increased substantially beyond the minimum speed at which little if any damage would occur, at the underlying surface, but still have quite effective removal of the rubber layer. Another advantage of this is that it permits configurations of the apparatus (as will be described in detail herein) that can accomplish this cleaning operation more effectively.

Within the broader scope of the present invention, it is contemplated that the method and apparatus of the present invention could be utilized in other applications where similar problems are encountered (i.e. where the underlying material is susceptible to damage by high power water jets, and the material to be removed is quite responsive to removal by water jets with a very brief "dwell time" (a term which will be defined hereinafter.) Thus, it is contemplated that within the broader scope of the present invention, the substrate could encompass rock, brick, or even possibly some easily damaged metalic material such as aluminum. The surface materials could also include such things as paint, crayon, or other such materials.

It is believed that a clearer understanding of the present invention will be obtained by first describing generally the apparatus 10 incorporating the novel features of the present invention, with this being followed by a more detailed description of the same.

Figure 1:
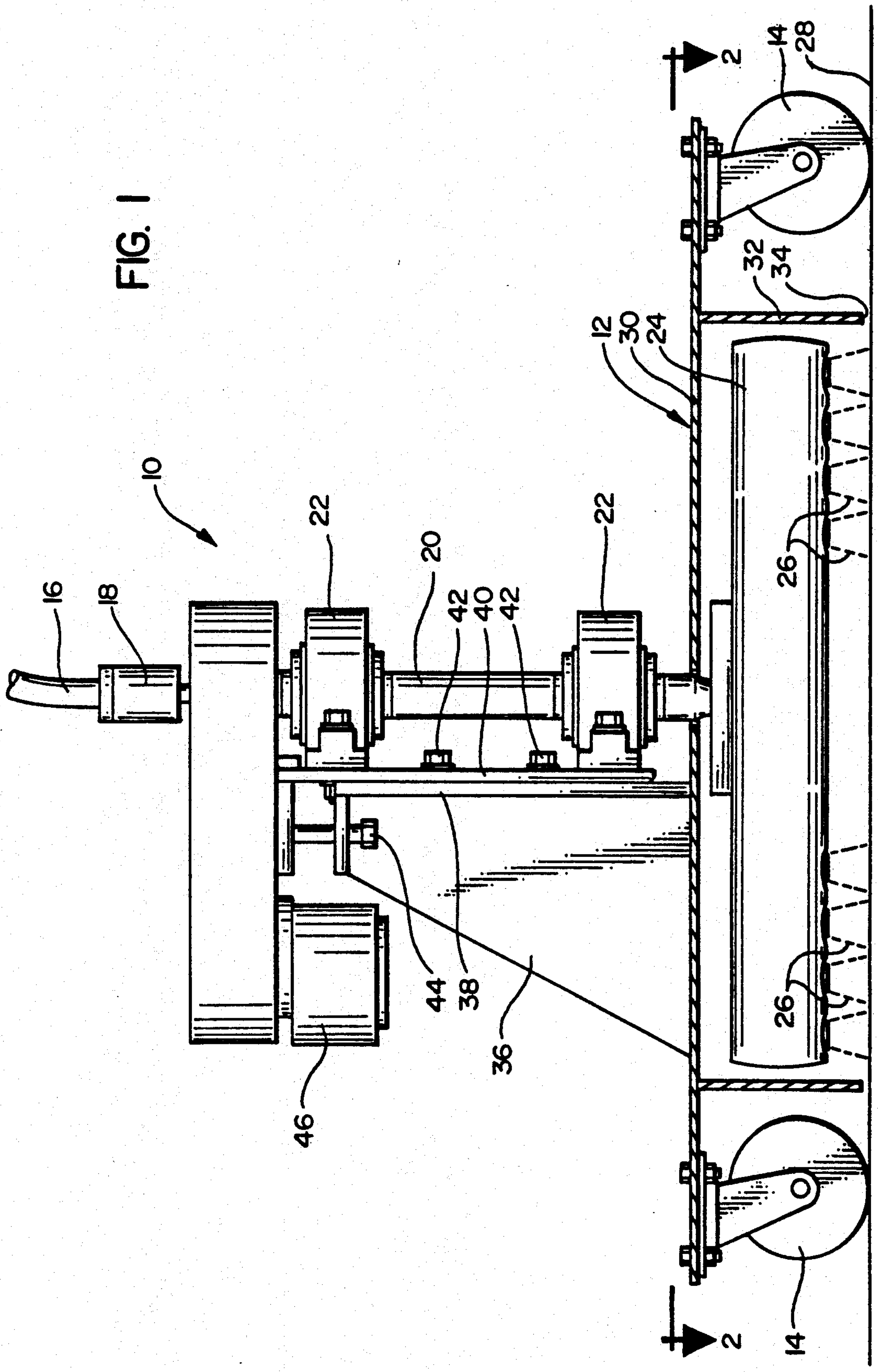
FIG. 1 is a side elevational view of the apparatus of the present invention.

With reference to FIG. 1, the runway cleaning apparatus 10 comprises a mobile support structure 12 mounted on wheels 14. An intake nose 16 feeds very high pressure water (e.g. 40,000 PSI) through a swivel connection 18 through a rotating shaft 20 mounted on bearings 22 and into a jet manifold 24 fixedly mounted to the shaft 20. The jet manifold 24 rotates with the shaft 20 at a relatively high speed and discharges a plurality of water jets 26 downwardly against the runway surface 28.

The support structure 12 comprises a horizontal platform 30 having a depending peripheral skirt 32 that extends around the rotating manifold 24. The bottom edge 34 of the skirt 32 is positioned relatively close to the runway surface 28, but is spaced a short distance above the surface 28 so as to be able to pass over small obstacles. The manifold 24 and other components are vertically adjustable, and this is accomplished by providing a first support column 36 having a vertical mounting plate 38 to which is connected a vertically adjustable plate 40. The two plates 38 and 40 are connected to each other by bolts 42 which can be loosened to permit the vertical adjustment by means of a vertical adjustment screw 44.

Figure 3:
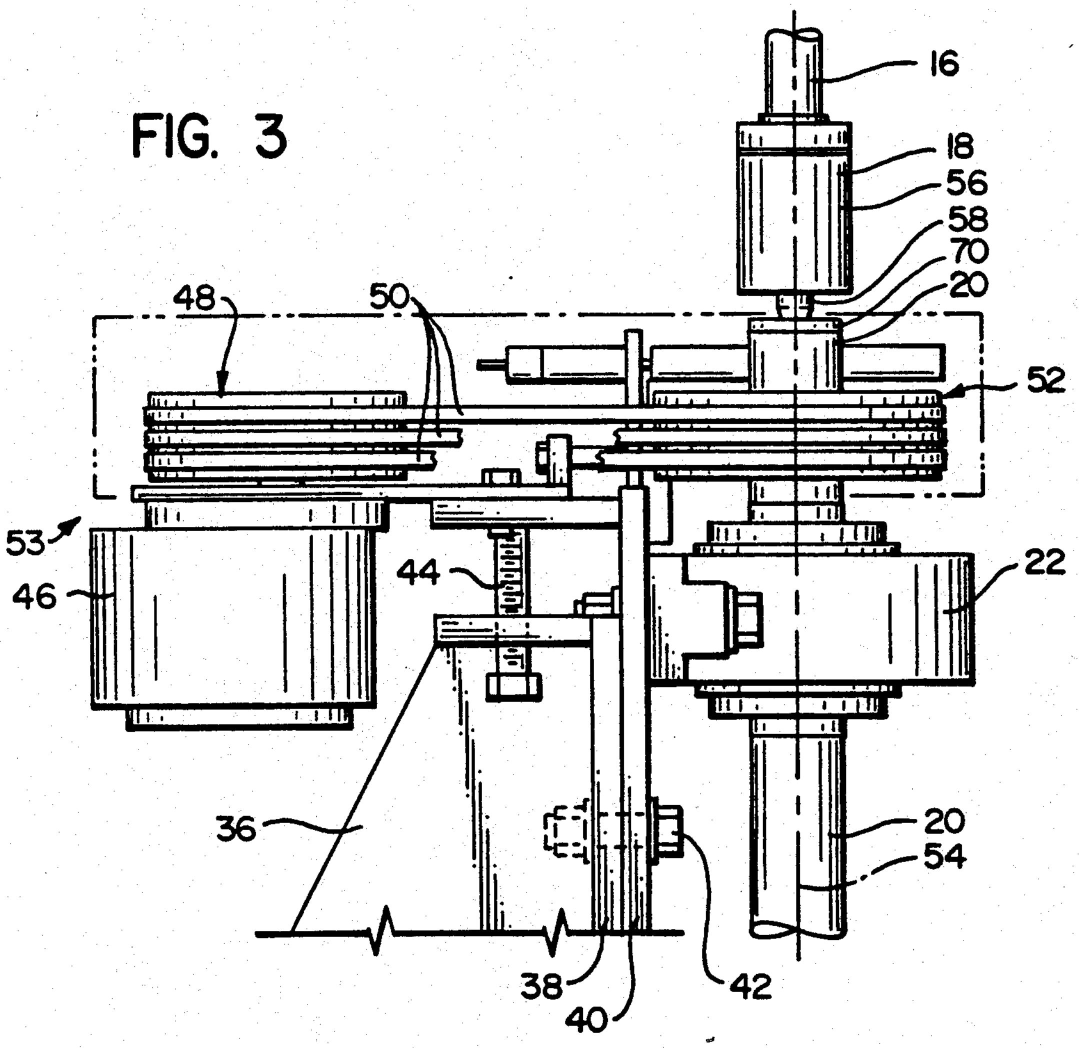
FIG. 3 is a side elevational view of an upper portion of the apparatus of the present invention, with an upper housing section for the drive transmission being shown in broken lines.

To rotate the shaft 20, there is provided an hydraulic motor 46 which rotates a first set of sheaves 48 which connect to drive belts 50 to rotate a second set of sheaves 52 that are fixedly connected to the aforementioned shaft 20 (See FIG. 3). These components (the motor 46, the sheaves 48 and 52 and the belts 50) comprise a shaft drive assembly 53. The drive assembly 53 and the two bearings 22 are mounted to the vertically adjustable plate 40. With the jet manifold 24 being connected to the shaft 20, the manifold 24 can be located at a precise position above the runway surface 28 by vertical adjustment of the plate 40.

To briefly describe the overall operation of the apparatus 10, the high pressure water is supplied from a suitable source (e.g. a very high pressure pump, which is not shown for ease of illustration) to pass through the hose 16 the shaft 20 and into the manifold 24. The motor 46 rotates the shaft 20 and the manifold 24 at a relatively high rate of speed (e.g. 2500 RPM) so that the water jets 26 pass over the runway surface 28 at a relative high rate of speed. With the outermost pair of jets 26 being spaced approximately twelve inches from the axis of rotation 54, the linear rate of travel of the outermost set of jets 26 over the runway surface 28 is approximately 180 miles per hour. The more inwardly positioned jets 26 have a reduced linear speed proportional to the distance from the axis of rotation 54. The manner in which these water jets 26 act upon the runway surface 28 to clean the rubber layer therefrom without causing damage to the concrete is considered to be significant in the present invention and will be discussed in more detail later herein.

Figure 2:
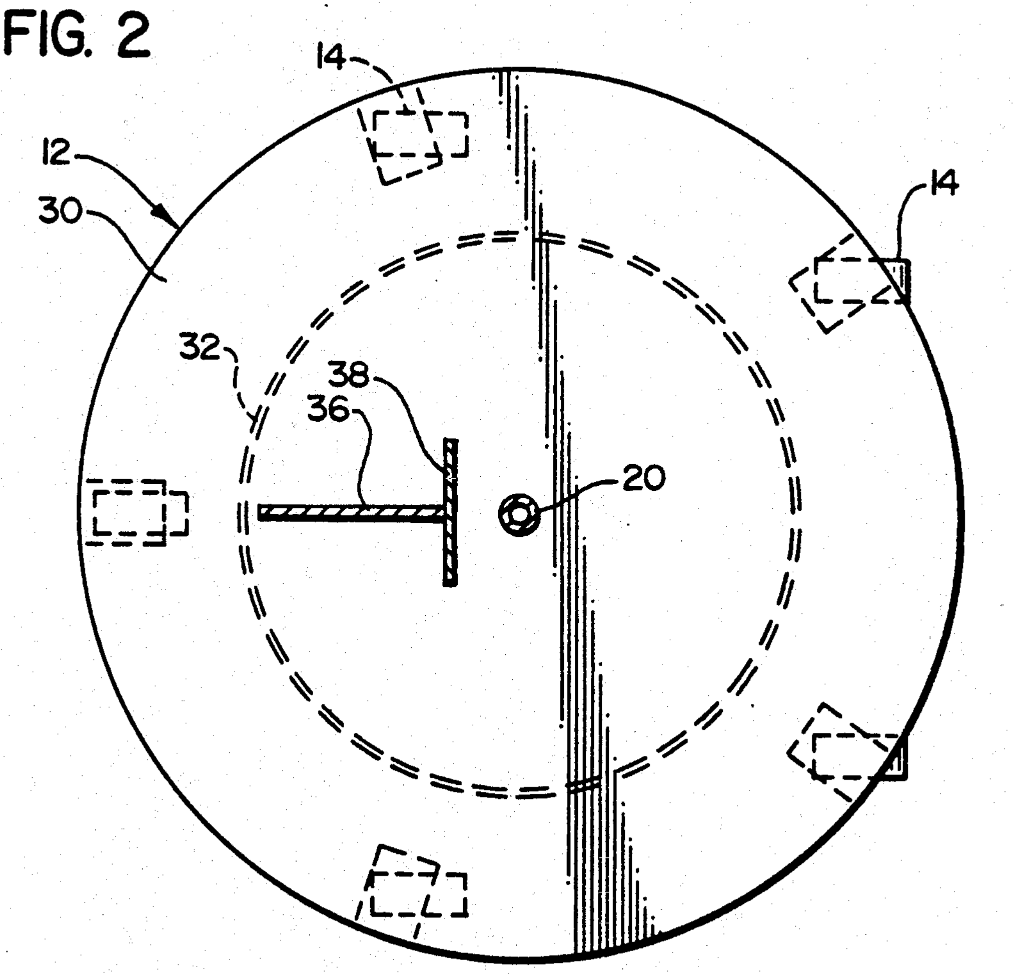
FIG. 2 is a somewhat schematic plan view showing only the housing platform and the wheel mounts to illustrate the location of the ground wheels.

With reference to FIG. 2, it can be seen that there are five ground wheels 14 positioned at equally spaced intervals around the circumference of the support platform 30. Thus, if one of the wheels 14 passes over a depression in the runway surface 28 (or even if two of the wheels 14 which are not immediately adjacent to one another pass over such depressions), the apparatus 10 will not tilt from the desired horizontal position or move downwardly relative to the runway surface 28.

Figure 5:
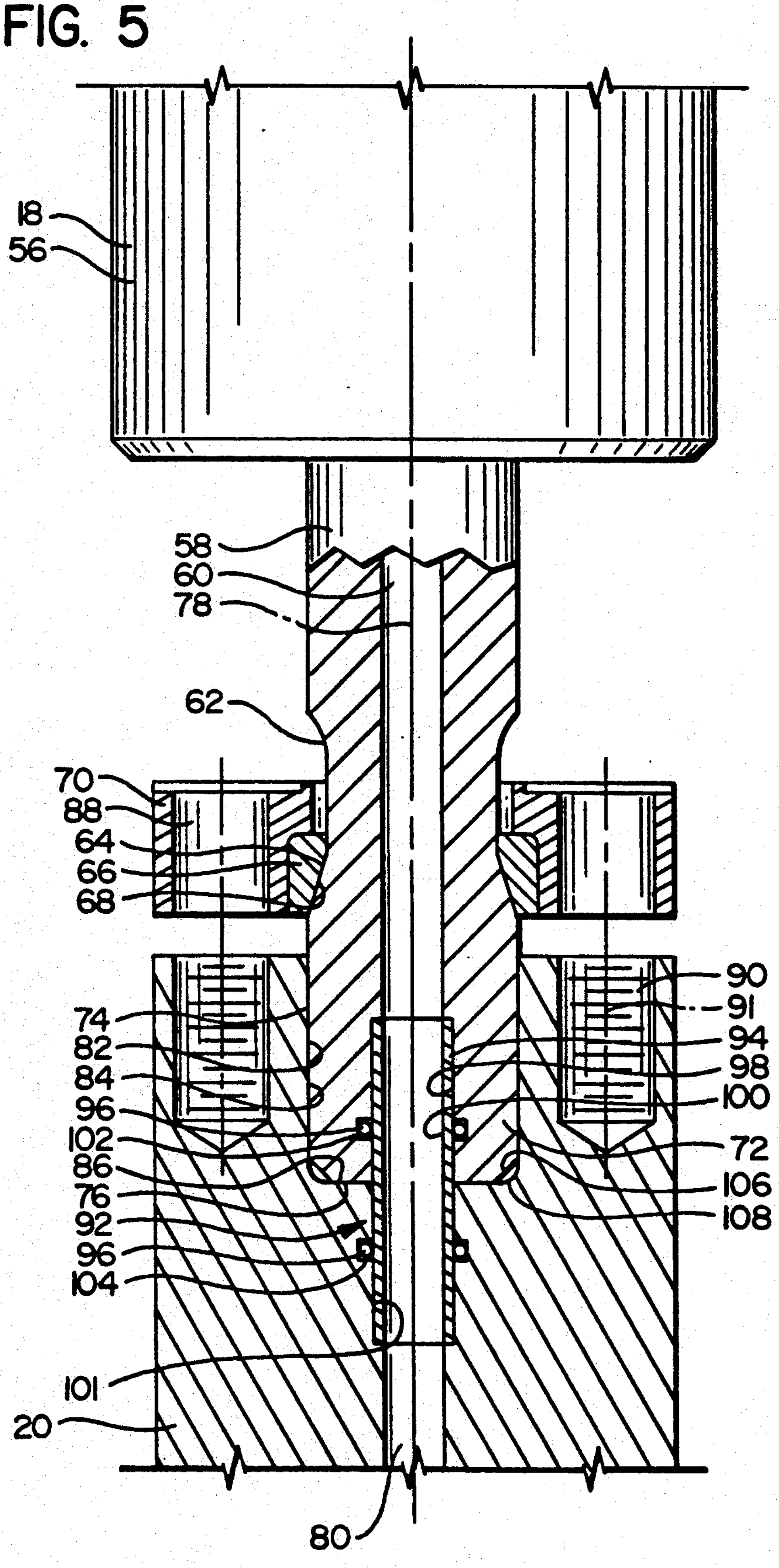
FIG. 5 is a view partly in section, showing an upper portion of the drive shaft of the present invention.

Reference will now be made to FIG. 5 to discuss in more detail a first significant feature of the present invention. The aforementioned swivel 18 comprises a swivel housing 56 in which there is mounted a rotating swivel shaft 58 having a central through passageway opening 60. The manner in which the shaft 58 is mounted in the swivel housing 56 can be accomplished in a conventional manner. However, the manner in which this shaft 58 is connected to the main shaft 20 in a manner to obtain proper alignment and an effective seal for the high pressure water passing therethrough is believed to be significant in the present invention.

It will be noted that the swivel shaft 58 has a circumferential recessed surface portion 62, with a lower surface portion 64 of t is recess 62 having a frusto-conical shape. There is a split ring comprising two one hundred and eighty degree segments 66 which have radially inwardly facing frusto-conical surfaces 68 that fit against the surface portion 64 of the swivel shaft 58. A unitary retaining ring 70 is initially inserted over the shaft 58 and the ring segments 64 are put into place. Then the ring 70 is moved into the position shown in FIG. 5 to engage the two split ring sections 66 and press the surfaces 68 against the shaft surface portion 64.

The lower end portion 72 of the swivel shaft 58 has a cylindrical configuration with a cylindrical side surface 74 and a lower end surface 76, both of which surfaces 74 and 76 are formed within reasonably close tolerances. More specifically, the end surface 76 is machined (or otherwise formed) within sufficiently close tolerances so that it is precisely perpendicular to a center axis 78 of the swivel shaft 58.

The main drive shaft 20 has a center through opening 80, and the upper end portion of the shaft 20 is formed with a cylindrical recess 82 having an inner side cylindrical surface 84 having a reasonably close tolerance fit with the side surface 74 of the swivel shaft 58. Likewise, the bottom surface 86 of the recess 82 is accurately formed so as to be precisely perpendicular to the longitudinal center axis of the shaft 20. Since the main drive shaft 20 and the swivel shaft 58 are, in the present invention, joined to one another in a manner that their respective longitudinal center axes are as much as possible coincident, the longitudinal center axis 78 of the swivel shaft 58 will be assumed to be the same as the previously mentioned longitudinal center axis 54 of the main drive shaft 20.

The retaining ring 70 is formed with four vertical through openings 88 which are aligned with vertical threaded sockets 90 to receive therein suitable fasteners (e.g. bolts, which are indicated schematically by dotted line 91) to press the swivel shaft 58 into proper engagement with the main drive shaft 20. With the end surface 72 of the swivel shaft 58 and the bottom surface 86 of the recess 82 both being precisely perpendicular to the center axis 78 within quite close tolerances, pressing the shaft 58 toward the shaft 20 brings the swivel shaft 58 into close alignment with the main shaft 20.

To provide a proper seal for the high pressure fluid flowing through the swivel shaft opening 60 and into the center passageway or opening 80 of the shaft 20, there is a seal assembly 92 comprising a seal sleeve 94 and a pair of O-rings 96. The lower end of the swivel shaft 58 is formed with a cylindrical outwardly stepped recess 98 at the lower end of its opening 60 to receive the upper end of the seal sleeve 94 so that the interior surface 100 of the seal sleeve 94 is closely aligned with the interior surface of the passageway or opening 60. In like manner, the main shaft 22 is formed with a matching recess 101 to receive the lower end of the seal sleeve 94. The two O-rings 96 fit in respective circumferential grooves 102 and 104 formed in the swivel shaft 58 and the main shaft 20, respectively, at locations surrounding the outer surface of the seal sleeve 94 and a short distance above and below respectively, the location of the abutting transverse surfaces 76 and 86.

It will be noted that the lower circumferential edge of the swivel shaft 58 is champhered as at 106 (formed as a frusto-conical surface) and that the adjacent circumferential surface portion of the lower portion of the recess 82 of the shaft 20 is formed (as seen in peripheral cross section) with a circular configuration. The champhered surface 106 enables the rounded surface 108 to be formed but yet maintain a proper abutting engagement of swivel shaft 58 and shaft 20. The rounded surface 108 relieves potential stresses in the shaft 20.

To describe briefly the operation of the seal assembly 92, when there is low pressure in the openings or passageways 60 and 80, the O rings 96 provide adequate sealing at such low pressures, thus permitting the seal sleeve 94 to become activated as fluid pressure increases. This seal sleeve 94 is made of a relatively strong plastic material (e.g. nylon), and under higher pressures, this sleeve 94 is pressed into firm engagement with the surfaces 110 and 112 of the recesses 100 and 101 to provide the proper seal at higher pressures.

With regard to the advantages of the connection between the swivel shaft 58 and the main shaft 20, it should be understood that with the very high fluid pressures involved, it is generally desirable to make the shafts 20 and 58 of high strength steel, which is somewhat brittle. Further, with the very high rotational speeds involved, and with the shafts 58 and 20 being subjected to high internal pressure from the water contained therein, premature breaking would occur in the prior art configuration employed by the assignee of the applicants, particularly breakage of the swivel shaft 58 at the area of connection to the shaft 20. However, it has been found that the connection and seal provided by the present invention (as described above) for the shafts 58 and 20 has substantially alleviated these prior art problems.

A quite similar connection and seal arrangement is provided between the lower end of the main drive shaft 20 and the manifold 24. (See FIG. 4.) Accordingly, this lower connection will not be described in detail herein, but rather components which are similar to components of the upper connection between the shafts 58 and 20 will be given like numerical designations with an "a" suffix distinguishing those of the second lower connection. Thus, the lower end of the shaft 20 is provided with a circumferential recess 62*a* having a lower frusto-conical surface portion 64*a* which is engaged by the two sections 66*a* of a split ring that in turn are pressed downwardly by a retaining ring 70*a*. The seal sleeve is shown at 94*a*, and there are two O rings 96*a*. The aligned openings by which the connection between the ring 70*a* and the manifold 24 can be made are indicated at 88*a* and 90*a*.

Figure 8:
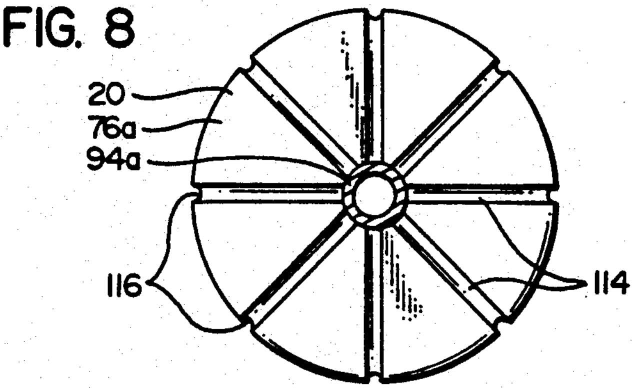
FIG. 8 is a somewhat schematic view taken along a horizontal plan and looking at a downwardly facing abutment surface of the lower end of a drive shaft, and illustrating pressure relief grooves formed therein.

However, there is a modification in this lower connection and seal and this will be explained with reference to FIG. 8, which is a sectional view taken at the plane at which the end surface 76*a* of the shaft 22 meet the matching surface 86*a* of the manifold 24. There are provided a plurality of radially extending slots 114 beginning at the location of the seal sleeve 94*a* and extending radially outwardly to the periphery of the surface 76*a*. The purpose of these slots 114 is that in the event the seal sleeve 94*a* fails, there would be passageways to relieve the fluid pressure. These slots 114 extend upwardly, as at 116 along the cylindrical side surface of the lower end of the shaft 20 and lead into an open area 118 between the ring 70*a* and the manifold 24.

Figure 4:
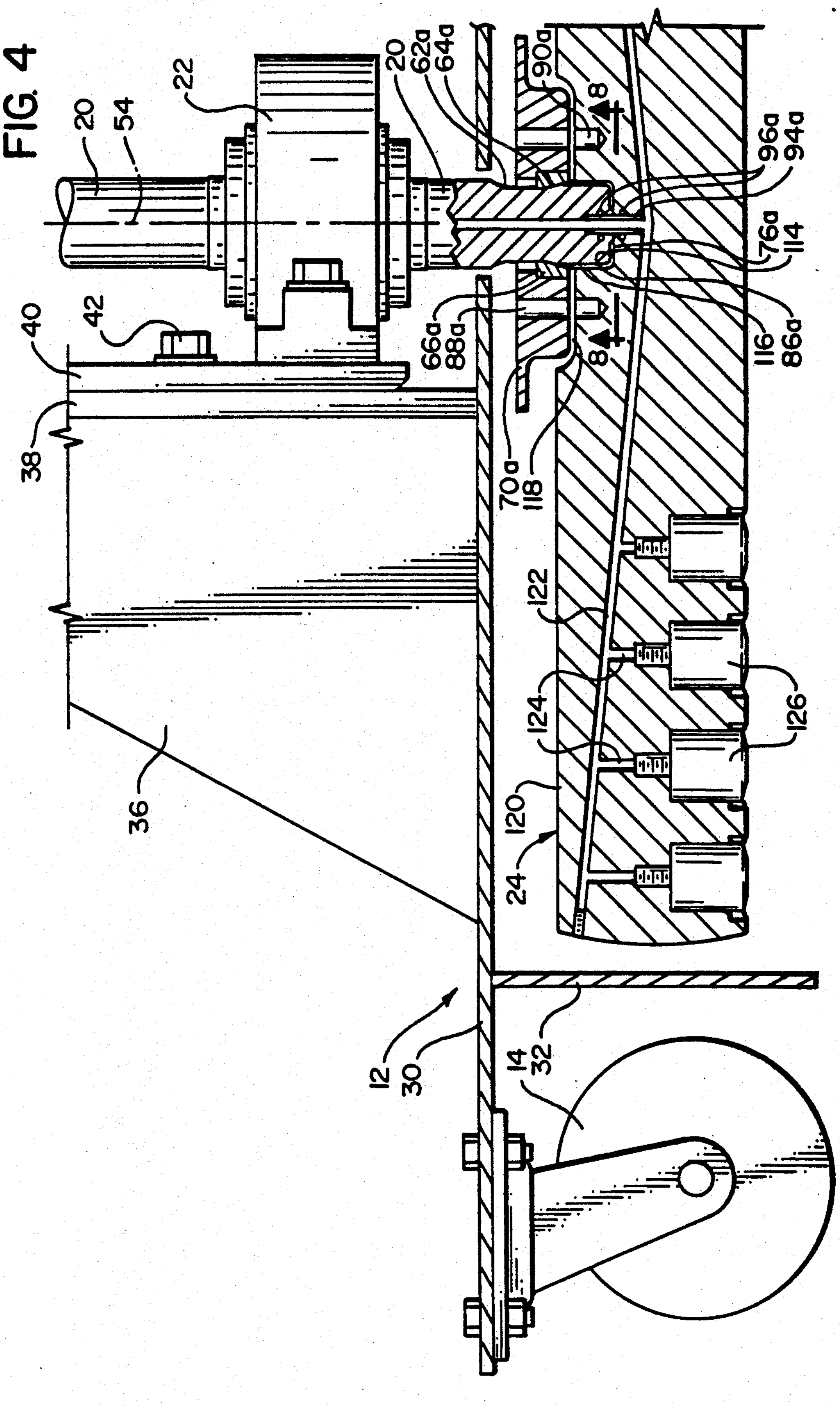
FIG. 4 is a view similar to FIG. 3, but showing the lower portion of the apparatus of the present invention.

To describe the manifold 26 in more detail, this manifold 26 has an elongated configuration and in effect comprises two arms 120 extending oppositely from one another from the longitudinal axis of rotation 54. (See FIG. 4.) Each of these arms 120 is formed with a related main radially extending water passageway 122 which leads through a plurality of downwardly extending passageways 124 into respective nozzle units 126. For convenience of illustration, only one of the arms 120 is shown in the drawing of FIG. 4, it being understood that the other arm 120 has substantially the identical construction.

Figure 6:
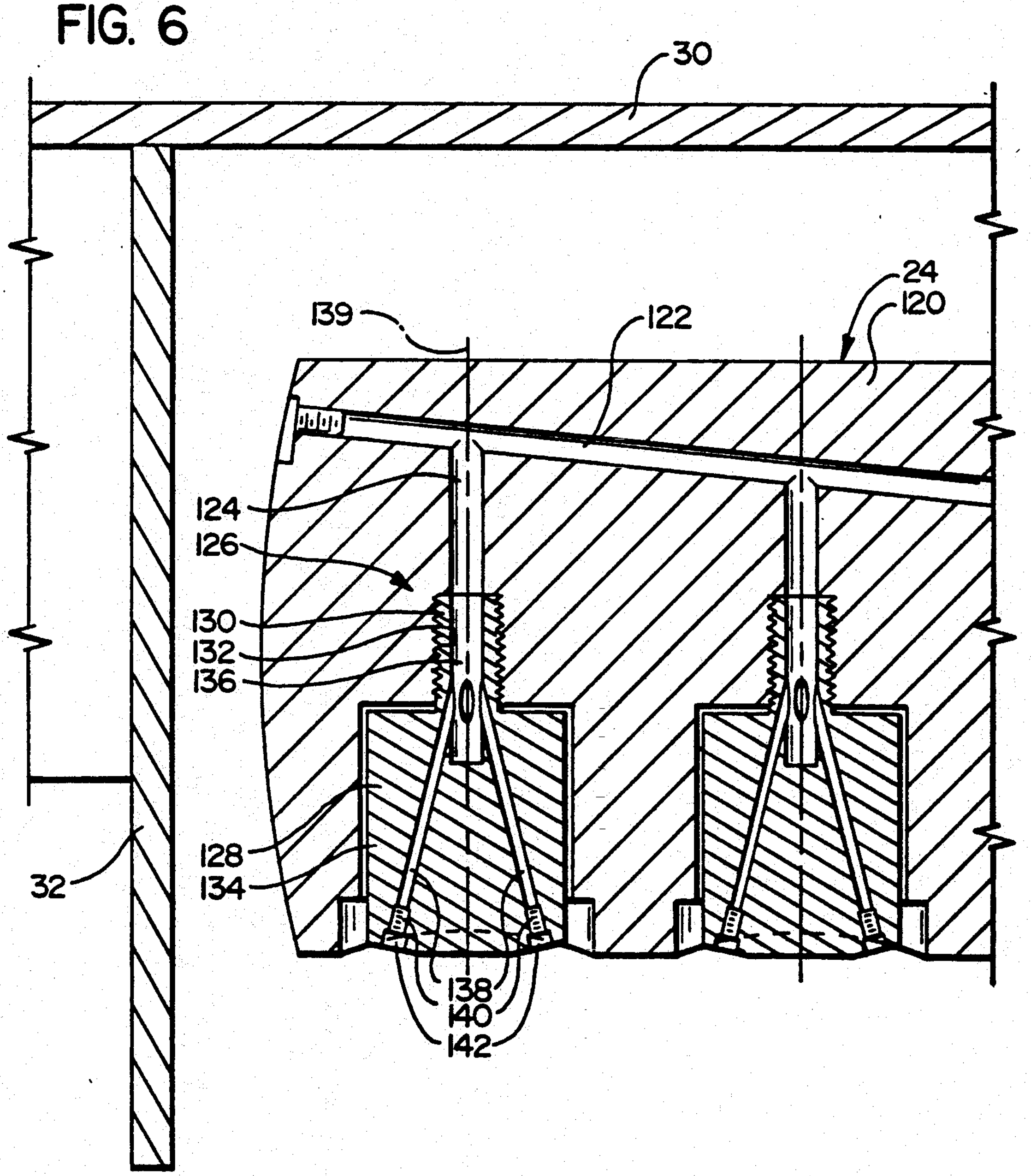
FIG. 6 is a view of an end portion of the manifold arm, partly in section, and showing a nozzle assembly used in the present invention.

These nozzle units 126 are, or may be, of a conventional design. As shown in FIG. 6, each nozzle unit 126 comprises a nozzle block 128 having an upper threaded cylindrical portion 130 which fits in a matching opening 132 in the arm 120. This cylindrical member 130 in turn connects to a larger cylindrical distribution block portion 134. The cylindrical connecting portion 130 has a center passageway portion 136 connecting to its related aforementioned passageway 124, and this passageway 136 in turn leads through four distribution passageways 138 which extend from a vertical center axis 139 of the nozzle unit 128 downwardly and outwardly at a moderate angle of, for example, between ten to thirty degrees to the center axis 139. These four passageways 138 are evenly spaced from one another in a diverging configuration.

At the end of each passageway 138, there is a nozzle member 140 which is retained at the exit end of its related passageway 138 by a related set screw 142. As indicated previously, these can be provided in the form of prior art nozzles, with the nozzle 140 having a relatively small through opening (0.01 inch or less) through which the high pressure water exits as a jet, and with the retaining screw 142 having a central opening to let the water jet to pass therethrough.

As shown herein, each arm 120 of the manifold 26 has four nozzle units 126, with the outermost nozzle unit being spaced twelve inches from the center axis 54, the next nozzle unit 126 being spaced ten inches, and with the next two being spaced at eight inches and six inches, respectively, from the center axis 54.

As indicated previously, during the usual operation of apparatus 10 in performing a cleaning operation on a runway surface 28, the shaft 20 is rotated at a relatively high speed (e.g. 2500 RPM), so that the linear speed at the center line of outermost nozzle unit 126 is approximately 180 MPH. The linear speeds of the next three jets (preceding radially inwardly) are 150 MPH, 120 MPH and 90 MPH, respectively.

Before proceeding further with a detailed description of the apparatus, it bears repeating what was stated earlier herein, i.e. that certain significant features of the present invention are based at least in part upon the discovery that rubber material (or other materials having similar properties relative to removal by water jets) can be very effectively removed from a concrete or asphalt/rock aggregate surface(or a surface of some other material having similar properties relative to potential damage by a water jet) of an airport runway if a very high pressure water jet is moved at a relatively high linear speed over the concrete or asphalt/rock aggregate surface having the layer of rubber thereon, and that this can be accomplished without causing any noticeable damage to the runway surface 28. Further, it has been found that not only is there no noticeable damage to the concrete surface, but the cleaning operation itself is accomplished very efficiently, and a very high degree of rubber removal is achieved.

In this text, the runway surface 28 will be referred to as a concrete surface, it being understood that this is by way of example only, and the underlying surface could be an asphalt/rock aggregate surface, or within the broader scope of the present invention be some other surface material having similar properties relative to potential damage by a water jet.

As indicated previously, the commercial prior art device with which the assignee of the applicants is already aware operates a large number of water jets at a pressure of about 10,000 psi, with a linear speed of these jets being no higher than about ten MPH. In this prior art arrangement, the jets are positioned on a manifold that is mounted at a stationary location on a vehicle, and this vehicle travels over the runway surface. The volume of water used in this cleaning operation is as high as eighty gallons per minute, and the cleaning rate would be possibly in the area of 10,000 square feet of runway surface per hour.

On the other hand, by utilizing the present invention, the water utilized can be as low as about five gallons per minutes, but the linear speed of the jet and also the pressure of the jet would be substantially higher (e.g. a linear speed of as high as 90 to 180 MPH and a pressure as high as 35,000 P.S.I.). However, approximately the same amount of runway surface area (or possibly more) can be cleaned by use of the present invention, in comparison with the prior art apparatus mentioned above. Further, since the energy consumed in this type of apparatus is equal to the fluid pressure times the volumetric flow rate, the energy used by the apparatus of the present invention, compared to a comparable prior art machine, as described immediately above, would be about one fourth of the energy used in the prior art device. Further, a very significant consideration is that the prior art device causes flaking away of the concrete surface, while there is no noticeable flaking or damage of the concrete material by use of the apparatus and method of the present invention.

The proper utilization of a water jet in the present invention depends on a selection of the appropriate values for the pressure of the water jet, the linear speed of the water jet over the surface, and also the diameter of the water jet.

It can be hypothesized that the effectiveness of the present invention is based at least in part upon the significance of the "dwell time" of a high pressure jet acting on the rubber layer and also acting on the concrete surface itself, together with the pressure of the jet. However, it is to be emphasized that regardless of the accuracy of the following hypothesis, it has been found that the present invention does provide for very effective cleaning, without noticeable damage to the concrete surface.

The dwell time of a high pressure water jet traveling over a surface is computed by dividing the linear speed by the diameter of the water jet impinging on the surface. Thus, if the linear speed is one foot per second, and if the diameter of the water jet impinging on the surface is 0.01 inch, then the dwell time along a centerline of the jet parallel to the line of travel (i.e. the time period during which at least a portion of the water jet would be impinging directly on the surface) would be approximately one twelve hundredths of a second. On the other hand, if the linear speed of the water jet across the surface is, for example, 200 feet per second, with the diameter of the jet remaining at 0.01 inch, this dwell time is as short as one two hundred forty thousands of a second, (i.e. a little over four millionths of a second).

Also, the effect of the water jet on the surface depends on the pressure of the jet. A discovery which is significant in the present invention is that if the pressure of the jet is raised to a level sufficiently above that which was perceived to be adequate or desirable in the prior art, the dwell time of the jet can be reduced significantly to produce the result of very effectively removing the rubber from the concrete runway surface, while causing no noticeable damage to the underlying concrete surface. The linear speed of the water jet should be at least as high as twenty miles per hour, with fifty miles per hour being a preferred lower limit, and eighty miles per hour being a yet more preferred lower limit. In the preferred configuration of the present invention, the outermost jets have a linear speed of approximately one hundred eighty miles per hour and the innermost jets a lower speed of about ninety miles per hour. The upper limit of the speed of linear travel of the jet is mainly a function of the practical limitations of the apparatus, and as the linear speed of the jet becomes yet higher, the problems of designing apparatus adequate to attain such speeds become substantially greater. It is presently believed that an upper practical limit speed of a jet would be possibly four hundred miles per hour or less, but again this could conceivable be increased with further refinements or arrangements in the apparatus.

With regard to the pressure of the jet, it should be at least 20,000 psi, and more desirably as high as 25,000 psi and more desirably yet as high as 35,000 psi. A preferred practical range would be between 35,000 and 55,000 psi, but within the broader range of the present invention, yet higher pressures could also be used. However, the present information of the applicants indicates that the range of 35,000 to 55,000 psi is quite adequate, and the complexities of going to yet higher pressures, relative to the possible benefits, would dictate against using the higher pressures for this particular application.

With regard to the diameter of the water jet, as a general rule, the greater the linear speed, the larger is the permissible diameter of the water jet. Also, for a given linear speed, the diameter of the water jet should be reduced relative to the increase in the pressure of the jet. As indicated previously, as the pressure of the jet becomes greater, then the dwell time of the jet at the surface should be less, which would indicate that there should either be greater linear speed, smaller jet diameter, or both. In general, taking into consideration the practicalities of configuring apparatus for this particular rubber removal application, a jet diameter of about 0.01 inch or less is desirable (this measurement being the diameter of the nozzle through which the water jet is discharged). At greater diameters (e.g. 0.014 inch), any benefit achieved is believed to be outweighed by other factors.

In terms of dwell time, it is believed that the maximum dwell time should be no greater than forty thousandths of a second, and desirably much shorter. A one one hundred thousandths of a second dwell time would be more preferred, and one half a hundred thousandth of a second yet more preferred. In the preferred embodiment of the present invention described herein, the dwell time of the outermost jets 26 is a little less than one third of one hundred thousandth of a second, while the dwell time of the most radially inward jets is between about two fifths to one half of one hundred thousandth of a second (i.e. four to five one millionths of a second.)

In the preferred configuration shown herein, the water jets of the nozzle unit 26 at the radially furthest location of the arms 24 is 0.009 inch, while the diameter of the most radially inward water jet 26 is 0.007 inch.

Figure 7:
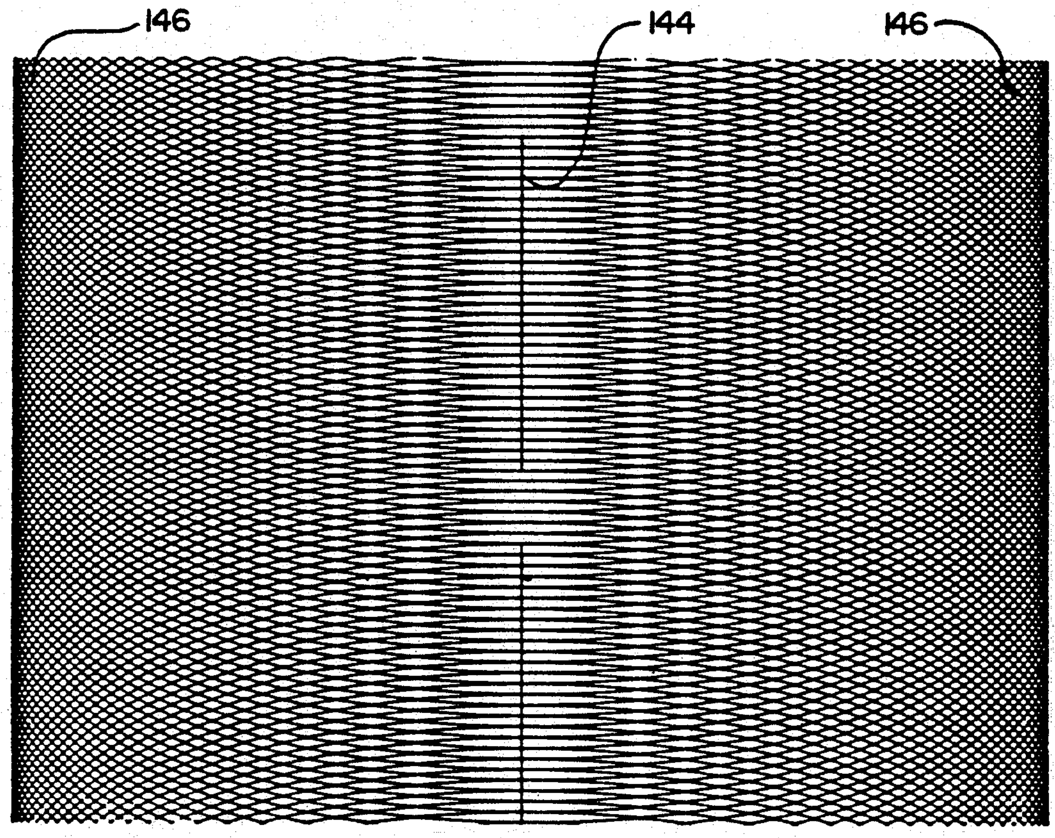
FIG. 7 is a plan view showing traces of sequential paths followed by a water jet rotating with the manifold arm, and with the apparatus 10 traveling over the ground in a typical cleaning operation.

Another feature of the present invention will be described with reference to FIG. 7. FIG. 7 represents the path of a single outermost water jet 26 which moves in a circular path, with the center axis of rotation moving at a relatively slow rate of forward linear speed relative to the rotational linear velocity of the water jet moving in a circular path. Thus, the circular lines representing rotational paths are spaced closely together. This axis of forward travel is designated 144. It can be seen that the extreme side portions 146 of the circular path of travel of the jet have the paths of the water jet positioned more closely to one another, with the spacing becoming greater in a laterally inward direction toward the center line 144 representing the forward path of travel. For purposes of illustration, the circular paths described by only one jet have been shown. It is to be understood, however, that where there is a multiplicity of such jets, there will be many more lines superimposed over this same pattern.

It should also be noted that the water jets 26 that are emitted at more radially inward locations (not shown for convenience of illustration) will describe circular paths of smaller diameters. Thus, there will be a superimposed closer patterns of spacing at other locations closer to the center line 144, because of some of the water jets 26 travelling paths of smaller radius.

Three things are noteworthy with regard to this pattern of travel of these water jets 26. First, it has been found that with the present invention, even though in some areas the spacing of the water jets 26 is more concentrated over the surface, there is no noticeable surface damage to any portion of the underlying runway surface 28. Second, even though the paths of the water jets 26 are spaced further apart from each other at a location nearer to the center line 144, it has been found that quite adequate cleaning occurs along the entire width of the area covered by the jets 26. Third, by providing the water jets 26 at radially spaced locations on the manifold 24, the patterns of the areas of concentration can be spaced at various locations closer inwardly toward the center line path 144 to provide for more uniform distribution of the water jets 26 over a greater percentage of the area.

In the operation of the specific apparatus 10 as described herein, it has been found that with the manifold 24 rotating at twenty five hundred rpms, and with the apparatus 10 advancing over the runway surface at a rate of approximately one hundred feet per minute, very effective cleaning can be achieved.

Desirably, the nozzle assemblies 126 are placed as close to the surface 28 as possible, possibly one quarter of an inch to one half an inch away. The orifice openings in the nozzles 140 are, in the preferred form of a circular cross-section, one of the reasons being for ease of manufacture. However, within the broader scope of the present invention, possibly the water jets could be discharged through oval openings. Further, the apparatus 10 should be operated so that the maximum gap between the paths of the jets 26 traversing the runway surface would be possibly as close as ten times the diameter of the water jets 26, as determined by the diameter of the nozzle opening. However, this spacing will vary, depending upon the thickness and nature of the material to be removed.

Figure 9:
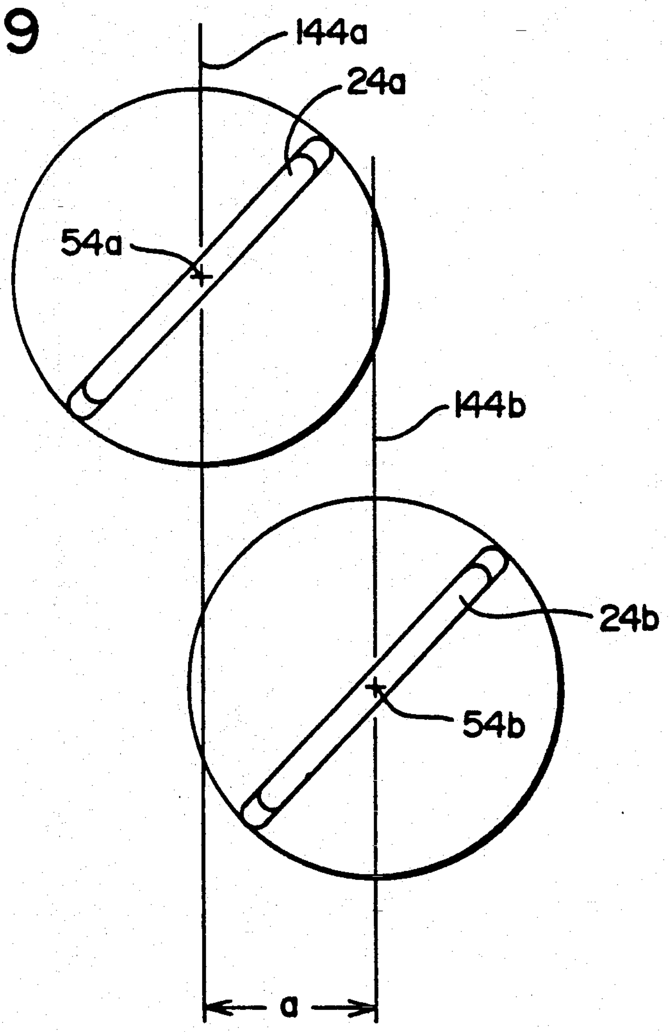
FIG. 9 is a highly schematic plan view of as second embodiment of the present invention.

FIG. 9 illustrates very schematically a second embodiment of the present invention where there are provided two rotating manifolds **24*a* and 24*b*, with these rotating about respective centers of rotation 54*a* and 54*b*. The lateral spacing "a" between the forward paths of travel 144*a* and 144*b* is equal to, or moderately less than, the radial distance from the center axis of rotation 54*a* or 54*b* to the outermost jet. The effect of this is that the middle portion of the linear path 144*a* of one manifold 24*a* where the spacing between the paths of the water jets 26 is greatest will overlap with the peripheral portion of the path of the jets 26 of the other manifold 24*b*. Thus, the forward rate of travel of the apparatus can be increased while still maintaining sufficiently close spacing of the paths described by the various water jets 26**.

An alternative means of accomplishing the same pattern as described above with reference to FIG. 9 would be simply to utilize the one manifold 24, and move this in successive paths which overlap one another so that the center portion of one path would be overlapped by the peripheral portion of the subsequent path.

It is to be understood that various modifications can be made in the present invention without departing from the basic teachings thereof.

What is claimed:

1. An apparatus to remove a first material from an underlying substrate surface of a substrate without significant damage to said substrate surface, where the substrate surface is characterized in that it is susceptible to damage by impingement of a high pressure water jet thereon, and said first material is characterized in that is it susceptible to removal from an underlying surface by impingement of a high pressure water jet therein, said apparatus comprising:

a. a housing structure adapted to move over said substrate;

b. manifold arm means mounted to said structure in a manner to be positioned above said substrate, and to be rotatable about a generally vertical axis of rotation;

c. water jet nozzle means mounted to said manifold arm means at a predetermined distance from said axis of rotation and arranged to discharge at least one water jet toward said substrate as said manifold arm means rotates about said axis of rotation;

d. fluid pressure supply means adapted to supply water to said manifold arm means at a pressure greater than twenty thousand pounds per square inch for discharge through said water jet nozzle means; and e. power transmission means adapted to rotate said manifold arm means at a rotational rate of speed so that said water jet travels linearly in a generally circular path at a speed at least as great as twenty miles an hour.

2. The apparatus as recited in claim 1, wherein said water jet nozzle means is arranged to discharge a plurality of water jets at at least first and second water discharge locations spaced at first and second radial distances from said axis of rotation, with said first distance being greater than said second distance.

3. The apparatus as recited in claim 2, wherein said water jet nozzle means is arranged so that the water jet discharged at said first location has a diameter greater than the water jet discharged at said second location.

4. The apparatus as recited in claim 1, wherein said fluid pressure supply means comprises a shaft and seal assembly connected to said manifold arm means, said shaft and seal assembly comprising:

a. a first shaft which has a first center axis of rotation and a through opening for passage of high pressure fluid therethrough, and an end surface that is precisely formed perpendicular to said first axis of rotation;

b. a second shaft which has a second center axis of rotation and a second centrally located through opening to receive high pressure fluid from the first opening of the first shaft and deliver said fluid to said manifold, and a second end surface that is formed to be precisely perpendicular to said second axis of rotation, said second end surface abutting against said first end surface at an abutment plane;

c. a seal sleeve having first and second portions positioned in said first and second shafts around said first and second openings to provide a seal at said abutment plane;

d. first and second O-ring means positioned in said first and second shafts, respectively, and extending around said first and second seal sleeve portions, respectively, in sealing relationship therewith.

5. The apparatus as recited in claim 4, wherein said first and second shaft means are formed with first and second recesses, respectively, at said first and second openings to receive therein, the first and second portions, respectively, of the seal sleeve.

6. The apparatus as recited in claim 5, wherein at least one of said first and second end surfaces is formed with radially extending groove means extending to said seal sleeve means to provide pressure release passageway means from said seal sleeve means.

7. The apparatus as recited in claim 5, wherein there is a retaining ring means adapted to engage said first shaft, and fastening means to urge said retaining ring means toward said second shaft so that said first and second end surfaces are pressed against one another.

8. The assembly as recited in claim 7, wherein there is split ring means comprising at least two split ring segments positioned within said retaining ring means to engage matching surfaces on said first shaft and to fit within said retaining ring means.

9. The apparatus as recited in claim 1, wherein there is first and second manifold arm means mounted for rotation about a first and second axis of rotation, respectively, said first and second axes of rotation being spaced from one another laterally relative to a longitudinal axis of forward travel of said apparatus, in a manner that a circular path of travel of a first jet means at said first manifold means overlaps a second path of travel of a second jet means on said second manifold means.

10. A shaft and seal assembly particularly adapted to rotate at relatively high speeds and to transmit a high pressure fluid therethrough, said assembly comprising:

a. a first shaft which has a first center axis of rotation and a through opening for passage of high pressure fluid therethrough, and an end surface that is precisely formed perpendicular to said first axis of rotation;

b. a second shaft which has a second center axis of rotation and a second centrally located through opening to receive high pressure fluid from the first opening of the first shaft, and a second end surface that is formed to be precisely perpendicular to said second axis of rotation, said second end surface abutting against said first end surface at an abutment plane;

c. a seal sleeve having first and second portions positioned in said first and second shafts around said first and second openings to provide a seal at said abutment plane;

d. first and second O-ring means positioned in said first and second shafts, respectively, and extending around said first and second seal sleeve portions, respectively, in sealing relationship therewith.

11. The apparatus as recited in claim 10, wherein said first and second shaft means are formed with first and second recesses, respectively, at said first and second openings to receive therein, the first and second portions, respectively, of the seal sleeve.

12. The apparatus as recited in claim 10, wherein at least one of said first and second end surfaces is formed with radially groove means extending to said seal sleeve means to provide pressure release passageway means from said seal sleeve means.

13. The apparatus as recited in claim 10, wherein there is a retaining ring means adapted to engage said first shaft, and fastening means to urge said retaining ring means toward said second shaft so that said first and second end surfaces are pressed against another.

14. The assembly as recited in claim 13, wherein there is split ring means comprising at least two split ring segments positioned within said retaining ring means to engage matching surfaces on said first shaft and to fit within said retaining ring means.

* * * * *